(No Model.) 7 Sheets—Sheet 1.

E. G. PARKHURST.
BREECH LOADING ORDNANCE.

No. 464,518. Patented Dec. 8, 1891.

Witnesses:
Henry L. Reckard.
F. Mallmr

Inventor:
E. G. Parkhurst
By his Attorney
F. H. Richards (No Model.) 7 Sheets—Sheet 2.

E. G. PARKHURST.
BREECH LOADING ORDNANCE.

No. 464,518. Patented Dec. 8, 1891.

Witnesses:
Henry L. Rickard
H. Mallner

Inventor:
E. G. Parkhurst,
By his Attorney
F. H. Richards (No Model.) 7 Sheets—Sheet 3.

E. G. PARKHURST.
BREECH LOADING ORDNANCE.

No. 464,518. Patented Dec. 8, 1891.

Witnesses:
Henry L. Reckard.
H. Mallner

Inventor:
E. G. Parkhurst
By his Attorney
F. H. Richards (No Model.) 7 Sheets—Sheet 4.

E. G. PARKHURST.
BREECH LOADING ORDNANCE.

No. 464,518. Patented Dec. 8, 1891.

Fig. 8ᵃ

Witnesses:
Henry L. Reckard.
J. Mallner

Inventor:
E. G. Parkhurst
By his Attorney
F. H. Richards (No Model.) 7 Sheets—Sheet 5.

E. G. PARKHURST.
BREECH LOADING ORDNANCE.

No. 464,518. Patented Dec. 8, 1891.

Witnesses:
Henry L. Reckard
L. Mallner

Inventor:
E. G. Parkhurst
By his Attorney
F. H. Richards (No Model.) 7 Sheets—Sheet 6.
E. G. PARKHURST.
BREECH LOADING ORDNANCE.
No. 464,518. Patented Dec. 8, 1891.
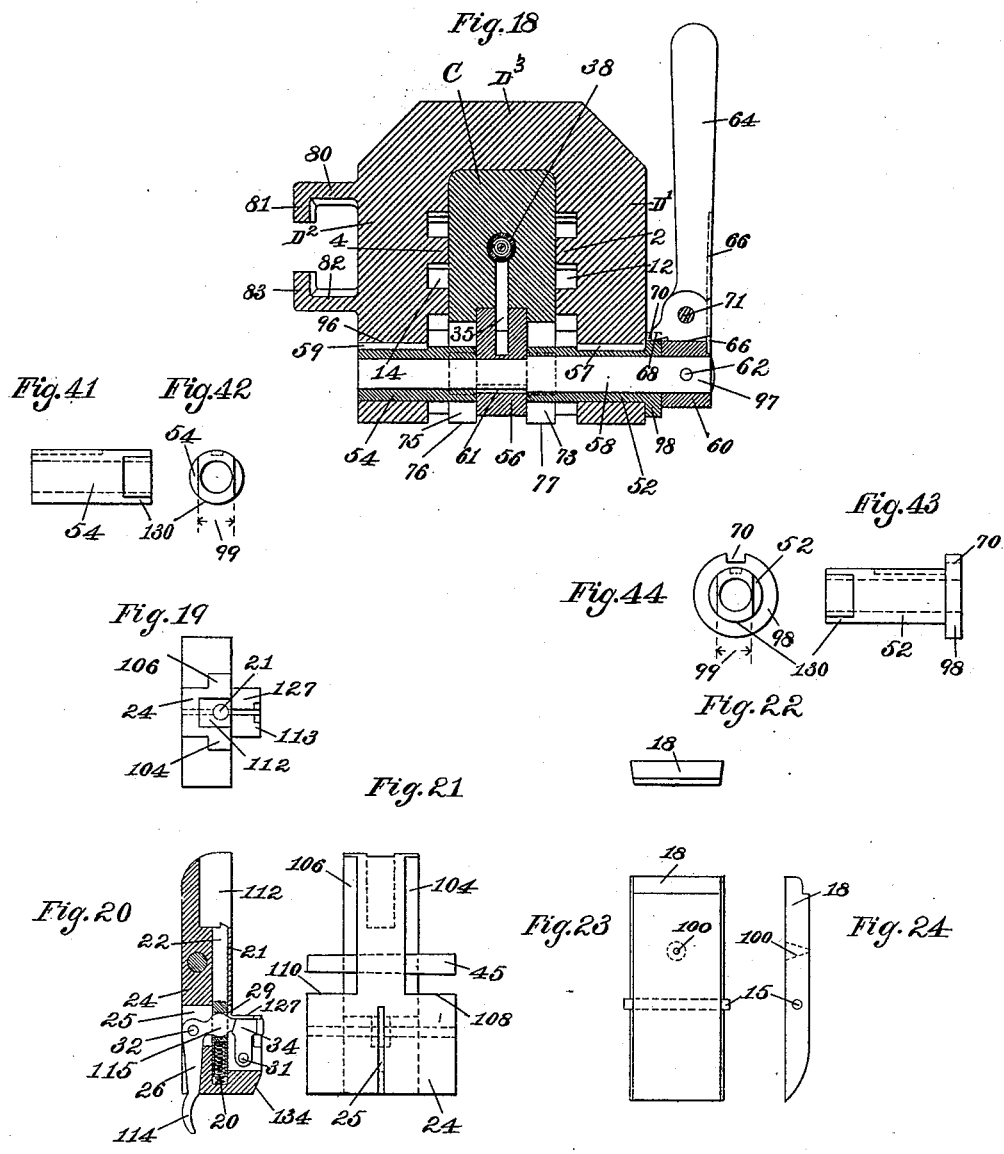
Witnesses:
Henry L. Reckard
H. Mallner
Inventor:
E. G. Parkhurst
By his Attorney
F. H. Richards

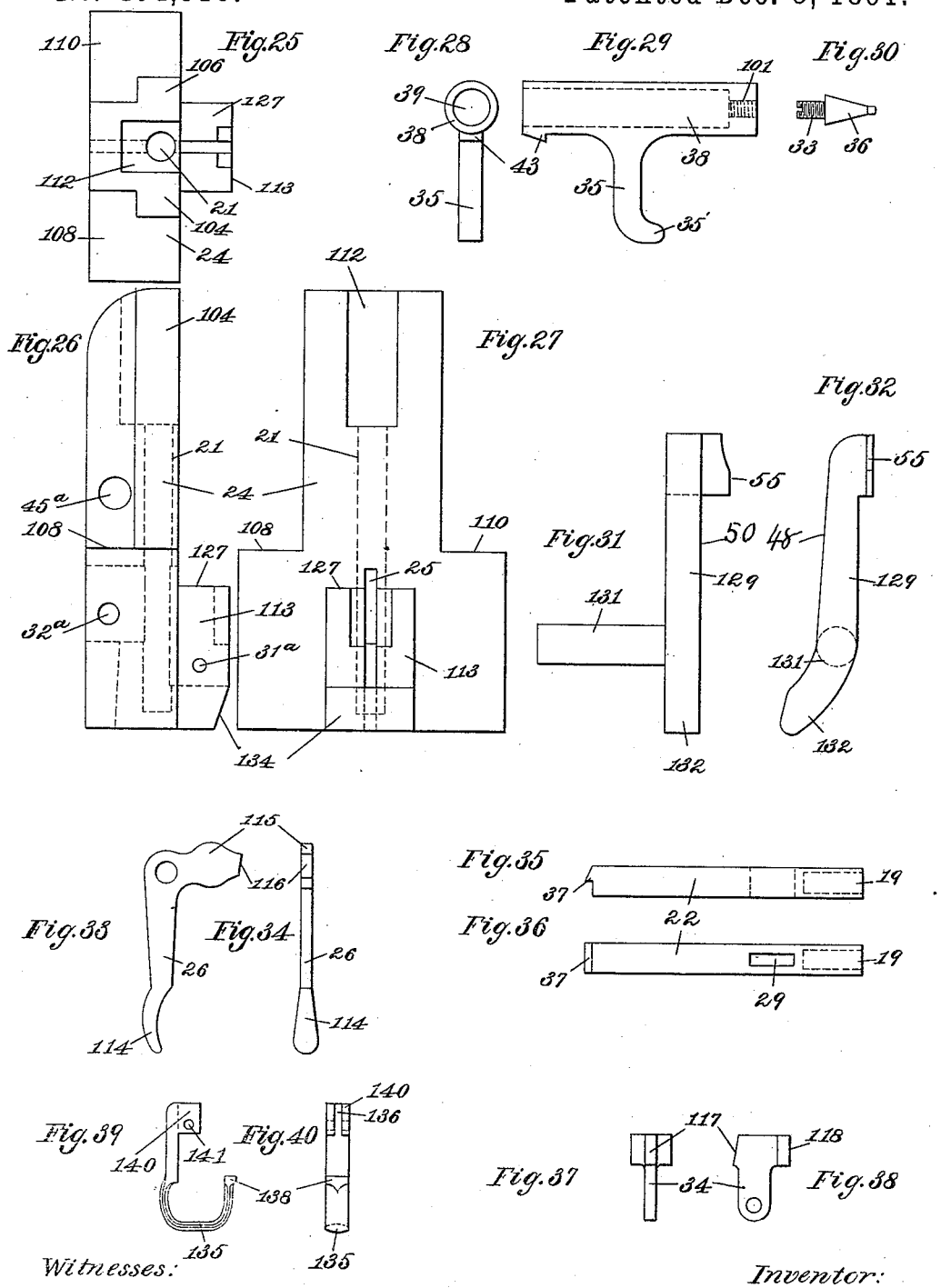

UNITED STATES PATENT OFFICE.

EDWARD G. PARKHURST, OF HARTFORD, CONNECTICUT.

BREECH-LOADING ORDNANCE.

SPECIFICATION forming part of Letters Patent No. 464,518, dated December 8, 1891.

Application filed January 26, 1891. Serial No. 379,024. (No model.)

*To all whom it may concern:*

Be it known that I, EDWARD G. PARKHURST, a citizen of the United States, residing at Hartford, in the county of Hartford and State of Connecticut, have invented certain new and useful Improvements in Breech-Loading Ordnance, of which the following is a specification.

This invention relates to that class of breech-loading ordnance in which the opening of the breech, extracting the empty shell, and cocking the gun are accomplished by the movement of an actuating-lever in one direction, and the closing of the breech and the making ready for firing are accomplished by a movement of the actuating-lever in a contrary direction.

The object of the invention is to furnish a rapid-firing single-shot gun having the breech-block constructed and arranged to first move downward and then swing backward in opening, and to be securely locked against recoil; also, to carry the principal operative parts of the firing mechanism.

Figure 1:
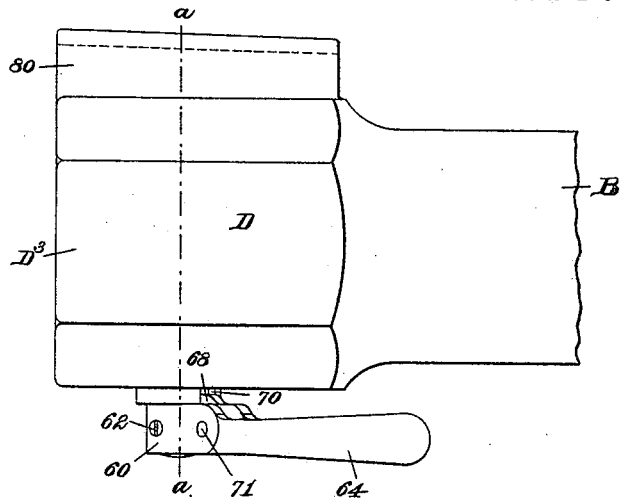
Figure 2:
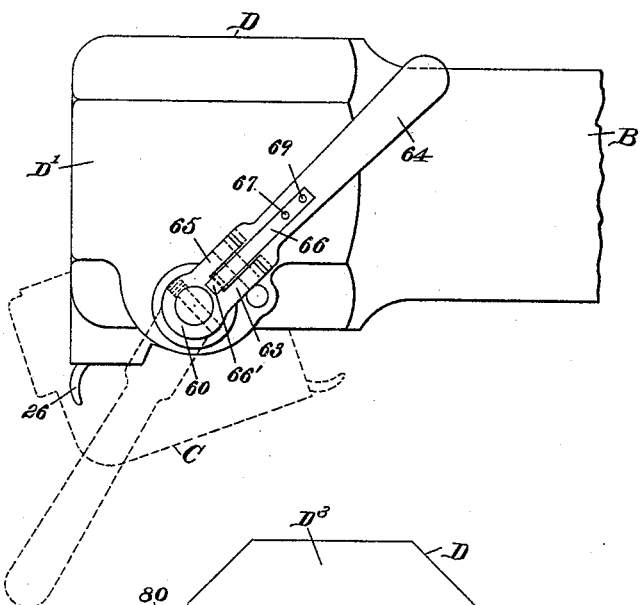
Figure 3:
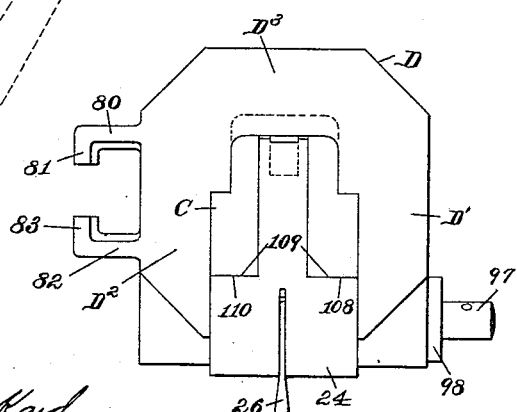
Figure 4:
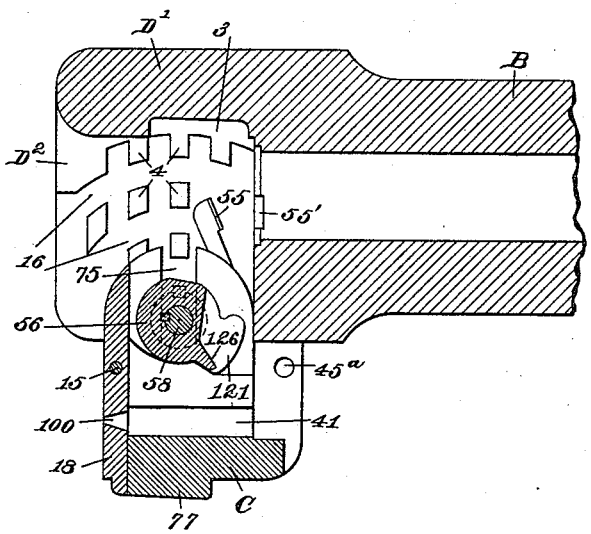
Figure 5:
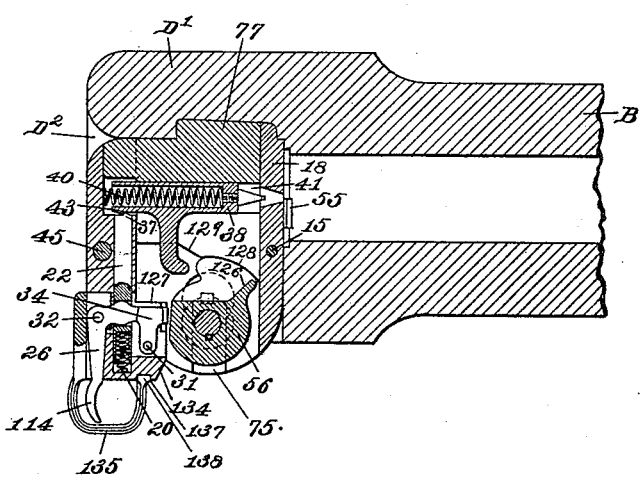
Figure 6:
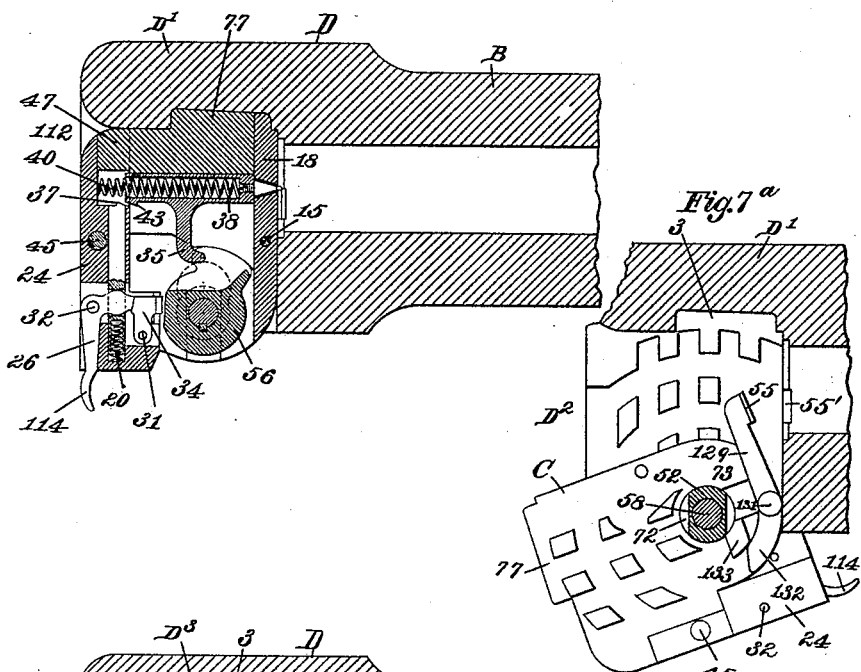
Figure 7:
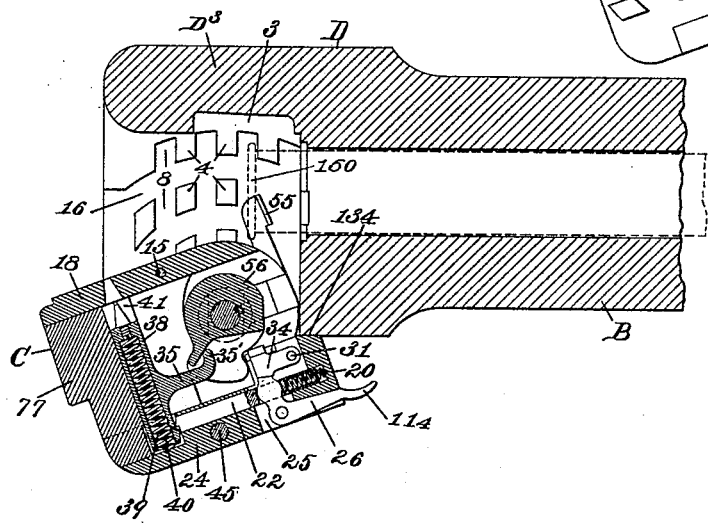
Figure 8:
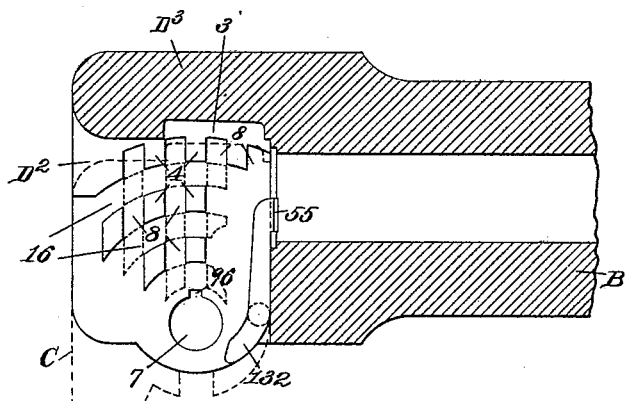
Figure 9:
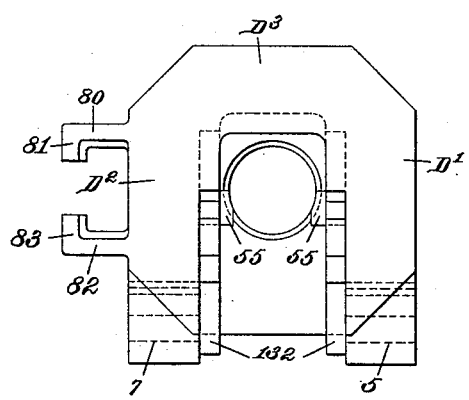
Figure 10:
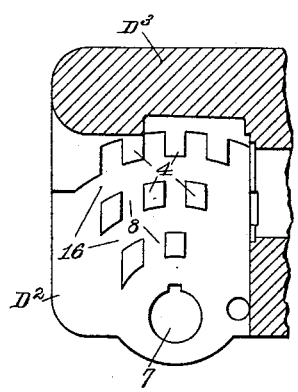
Figure 10:
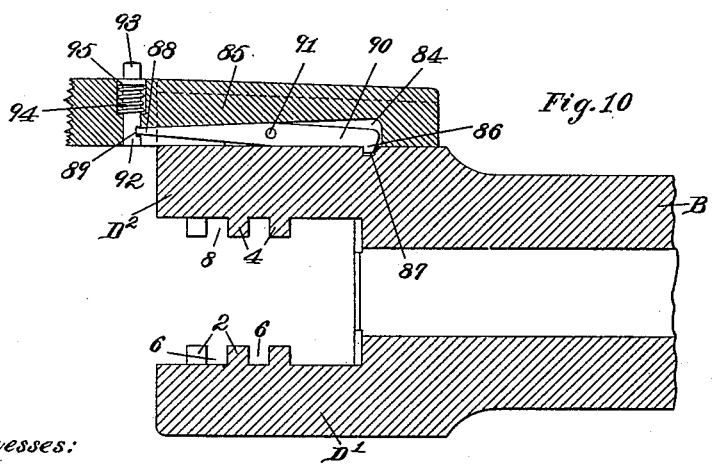
Figure 11:
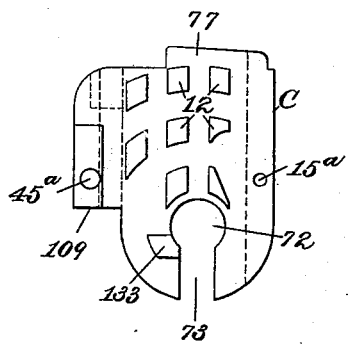
Figure 12:
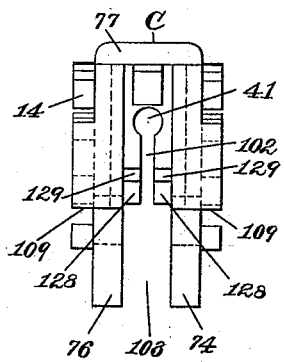
Figure 13:
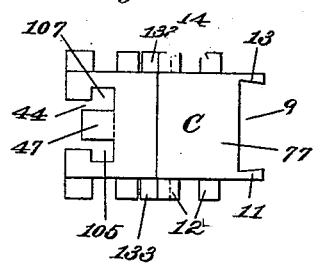
Figure 14:
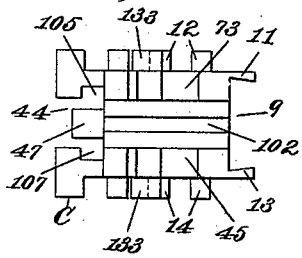
Figure 15:
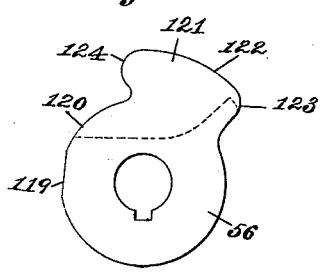
Figure 16:
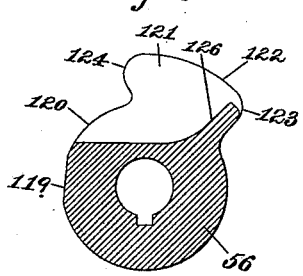
Figure 17:
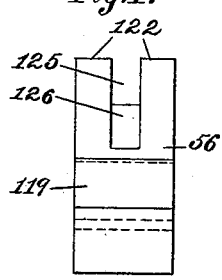

In the drawings accompanying and forming a part of this specification, Figure 1 is a plan view of the rearward portion or breech of a rapid-firing single-shot gun embodying my invention. Fig. 2 is a side elevation of the gun, drawn in projection with Fig. 1. Fig. 3 is a rear elevation of the gun with the actuating handle or lever and the shoulder-piece removed. Fig. 4 is a central vertical longitudinal section of the breech of the gun, illustrating the mode of assembling and disassembling. Fig. 5 is a similar view showing the gun ready for firing. Fig. 6 is a similar sectional view of the gun, showing the parts in their positions immediately after firing. Fig. 7 is a similar view, showing the gun cocked and the breech open ready to receive a cartridge. Fig. 7ª is a view similar to Fig. 7, but showing the breech-block in full and illustrating the mode of operating the extractors. Fig. 8 is a sectional view similar to Figs. 4 and 5, showing the breech-block removed and one of the shell-extractors in place. Fig. 9 is a rear view of the breech of the gun, all of the operative parts except the extractors being removed. Fig. 10 is a central horizontal longitudinal section showing the method of securing the shoulder-piece to the gun. Figs. 11, 12, and 13 are respectively a side elevation, a rear elevation, and a plan of the breech-block with all the operative parts removed therefrom. Fig. 14 is an inverted plan view of the breech-block. Figs. 15, 16, and 17 are a side elevation, a vertical section, and an edge view, respectively, on an enlarged scale, of the locking-cam. Fig. 18 is a vertical cross-sectional view of the gun, taken in line $a$ $a$, Fig. 1. Figs. 19, 20, and 21 are respectively a plan, a central vertical section, and a rear elevation of the trigger-block and the parts carried thereby. Fig. 22 is a plan, Fig. 23 a front elevation, and Fig. 24 an edge view, of the recoil-plate. Figs. 25, 26, and 27 are respectively a plan, a side elevation, and a rear view of the trigger-block, drawn on an enlarged scale and with the operative parts removed therefrom. Fig. 28 is a rear view, and Fig. 29 a side view, of the firing-pin slide, also drawn to an enlarged scale. Fig. 30 is a detail view of the firing-pin. Figs. 31 and 32 are a rear view and a side view, respectively, of one of the extractors. Fig. 33 is a side view of the trigger, and Fig. 34 a front view of the same. Figs. 35 and 36 are two views of the sear. Fig. 37 is a rear view, and Fig. 38 a side view, of the trigger-stop. Figs. 39 and 40 are side and front views, respectively, of the trigger-guard. Figs 41 and 42 are a plan and end elevation, respectively, of the right-hand cam-shaft bushing. Figs. 43 and 44 are similar views of the corresponding left-hand bushing.

Similar characters designate like parts in all the figures.

In the drawings only the rearward portion B of the barrel of the gun is shown. The gun-barrel terminates in an enlarged portion, designated in a general way by D and usually denominated the "breech-piece." The breech-piece consists of the side walls D' and D² and the top wall D³, the space for receiving the breech-block between said side walls being open on the lower side thereof and also at the rear end of the breech-piece, as will be understood by comparison of the several figures of drawings.

On one side (usually the left-hand side) of the breech-piece the gun is usually provided with means—as, for instance, the guides 80 and 82—for receiving the shank 85 of the usual shoulder-piece for assisting the gunner in the management of the gun. On their outer edges said guides have the oppositely-disposed hooks or ribs 81 and 83, respectively, for holding said shank in proper alignment. The shank of the shoulder-piece has a mortise 84 on its inner side to receive the lock bolt or hook 90, which is pivoted to said shank at 91, and its forward end has a hook 86 engaging a notch 87, formed in the breech of the gun. (See Fig. 10.) The opposite end 88 of the lock bolt or lever 90 engages in a notch at 89 in the sliding bolt 92, whose outer end 93 forms a thumb-piece for operating the sliding bolt and through this the said lock bolt or lever. The spring 94, surrounding the sliding bolt back of a collar 95, formed on said bolt, serves to normally actuate the bolt and lever and hold the same in the position shown in Fig. 10, said spring being contained in an enlargement of the bore containing said sliding bolt, as will be understood from the drawings. By pushing on the thumb-piece 93 the bolt is slid to swing the lever 90 on its pivot 91 and thus withdraw the hook 86 from the aforesaid notch 87, when the shank 85 may be withdrawn from between the guides 80 and 82, as will be understood without further or more particular description.

The sides D' and D² are each perforated on the same axis and near the lower edges thereof to form the bore 7, Fig. 8, for receiving the bushings 52 and 54, respectively, which are inserted from opposite sides of the breech-piece and are held in place by keys 57 and 59, respectively, fitting in keyways, as 96, Fig. 8, formed in said side walls. The cam-shaft 58 is journaled in said bushings, as will be understood from Fig. 18, and is provided with a lever 64, suitably affixed to the outer end 97 of said shaft. The forward position of said handle or lever is shown by solid lines in Fig. 2, the rearward position thereof being shown by dotted lines in said Fig. 2.

One feature of my present invention relates to the construction and mode of operation of said handle in connection with the cam-shaft, whereby the cam-shaft may be locked in its forward position. For this purpose the bushing 52 has thereon a flange 98, in which is formed the notch 70. (See Figs. 1, 18, 41, and 42.) The collar or hub 60 is fixed by means of the pin 62 or in other suitable manner to the projecting end of the shaft 58, said collar having the two ears 63 and 65, between which the lower end of the handle 64 is closely, yet freely, fitted, said handle being pivoted to said ears by the pin 71. The handle is shaped at its lower end substantially as shown in Fig. 18, so as to have a limited movement, and is provided with the catch 68, constructed to fit into the aforesaid notch. For actuating the handle to normally hold its said catch 68 in engagement with said notch said handle is provided with a suitable spring, as 66, secured thereto by the rivets (or screws) 67 and 69. This spring may be contained in a recess formed in the outside of the handle, as indicated by dotted lines at 66, Fig. 18, its point 66' bearing against said collar 60. The tendency of said spring, when the several parts are thus constructed and assembled, is obviously to throw the handle toward the left hand in Fig. 18, and thereby hold its said catch 68 in engagement with said notch 70. In operating the cam-shaft the gunner seizes the handle 64 and, throwing the same toward the right hand in Fig. 18, thus disengages it from the collar 98, when the cam-shaft is free to be turned by swinging the handle over to its dotted position in Fig. 2. No notch is shown for locking the handle in its said dotted position, since it is not deemed necessary to lock the mechanism except for holding the breech-block closed. The breech-block, which is designated in a general way by C, is journaled on the inwardly-projecting ends of the aforesaid bushings 52 and 54, respectively, and substantially fills the space between the sides D' and D² of the breech-piece. All of the operative parts of the firing mechanism are carried, directly or indirectly, by the breech-block, except the extractors and the locking-cam 56, which cam is keyed to the cam-shaft 58 by a suitable key, as 61, and is located between the bushings 52 and 54, respectively, and within a space therefor formed in the breech-block. The breech-block is bored at 72, Fig. 11, to fit and turn on the aforesaid bushings 52 and 54 and has the mortises or openings 73 and 75 from said bore 72 through the lower ends of the respective sides 74 and 76 of the block, the width of said openings corresponding to the thickness 99, Figs. 42 and 44, of the flattened ends of the bushings. When the breech-block is lowered to bring the bore 72 thereof in alignment with the bushings, as shown by dotted lines in Fig. 8, it is then free to turn on said bushings as journals; but when the block is thrown up to its vertical position (shown in Figs. 5 and 6) or to its lowermost position (shown in Fig. 4) the said opening 73 comes in alignment with said flattened bushing ends, and the block is then free to be moved up or down, as the case may be.

The side walls D' and D² of the breech-piece have on their inner sides a series of projections or lugs 2 and 4, respectively, which are constructed and arranged in vertical rows and also in circular rows concentric with the aforesaid bore 7. The concentric rows of projections are separated by circular grooves or channels, as 16, Fig. 8, and the vertical rows are separated by the parallel channels 6 and 8, respectively. The corresponding sides of the breech-block are provided with corresponding lugs or projections 12 and 14, respectively, which lugs are similarly arranged in parallel and concentric rows, which (when the bore 72 of the breech-block is in alignment with the bore 7 of the breech-piece) correspond with the circular channels of the breech-piece, so that the breech-block may then be turned on its journals from the position shown in Fig. 6 to the position shown in Figs. 7 and 4, respectively. By reason of the described parallel arrangement of the corresponding sets of projections when the breech-block is in its vertical position it is free to slide upward into engagement with said breech-piece projections, as in Figs. 5 and 6, or to be lowered to the position indicated by dotted lines in Fig. 8, out of engagement with the breech-piece lugs.

As an additional means for locking the breech-block against recoil when the block is raised, the top of the block is or may be provided with the projection 77, which fits into the corresponding recess 3, Figs. 8 and 9. In its front side the breech-block has a channel 9 formed between the forwardly-projecting sides 11 and 13 for receiving a recoil-plate 18, which is held in place by a pin 15, Fig. 24, fitting the hole 15$^a$ in said sides 11 and 13. (See Fig. 11.) The recoil-plate has a perforation 100, usually made conical and smallest on the forward side, from which the firing-pin may have access to the primer of the cartridge.

The breech-block is perforated in a direction longitudinally of the gun when the breech-block is closed for receiving the firing-pin slide 38, which in its preferred form (shown in the drawings) is a cylindrical piece having the bore 39 for receiving the mainspring 40. Said slide is bored and threaded at 101, Fig. 29, to receive the stem 33 of the firing-pin 36. The arrangement of these parts when assembled is shown in Figs. 5, 6, and 7. On its lower side the slide 38 has a downwardly-projecting arm 35, whose lower end 35' is fitted to engage with the locking-cam 56 for retracting the slide. At its rear end said slide has on the lower side thereof the catch 43 for engaging with the corresponding catch 37 of the sear 22, as shown, for instance, in Fig. 5. The arm 35 works in a slot or mortise 102, extending from the aforesaid bore 41, Fig. 12, to the space 103, Fig. 12, for receiving the locking-cam 56. The sear 22 is carried by the trigger-block 24, which is shown in detail in Figs. 25, 26, and 27. On its rearward side the breech-block has formed therein a T-shaped slot 44, as shown best in the plan views Figs. 13 and 14. The trigger-block 24 has the oppositely-disposed ribs 104 and 106, which engage in the side spaces 105 and 107, respectively, of said T-slot, being held in place by a pin 45, which passes through the hole 45$^a$, Fig. 11, in the breech-block and through a corresponding hole in the trigger-block, as will be understood by comparison of Figs. 11, 20, and 21. At a little distance below said pin the trigger-block is broadened, as shown in Figs. 21 and 27, the shoulders 108 and 110 abutting against the lower face 109 of the rearward part of the breech-block. (See Figs. 3, 11, and 12.) The trigger-block has a bore 21 vertically thereof for receiving the sear 22, (see Fig. 20,) and above said bore has a recess 112, the upper end of which fits over the rearward upper projection 47 of the breech-block, thus closing the upper end of said block when the parts are assembled thereon against access of dirt, &c. On its front side and at the lower end thereof the trigger-block has the projection 113, which reaches forward into the aforesaid space 103 adjacent to the locking-cam, as shown in Figs. 6 and 7.

A mortise 25 is formed in the trigger-block for receiving the trigger 26, which is pivoted to said block by a pin 32, which fits into the hole 32$^a$, Fig. 26, formed in said block. The lower end of the trigger has the usual finger-piece 114 extending below the trigger-block, and at its upper end has a forwardly-projecting arm, which is shaped at 115 to fit into a mortise 29 (see Fig. 36) in the sear. The trigger projects through said sear-mortise and has a beveled or inclined face 116, in the nature of a cam, adapted to bear against the corresponding face 117, Fig. 38, of the trigger-stop 34, which stop is pivoted at 31$^a$ in the aforesaid trigger-block projection 113, as will be understood from the drawings. The forward face 118 of said trigger-stop stands close to the periphery of the locking-cam 56, as shown in several of the figures of drawings.

When the mechanism is in position for firing, (shown in Fig. 5,) the firing-pin slide is retracted, the catch 43 thereof engaging the sear-catch 37, (being upheld by the sear-spring 20,) and the trigger-stop 34 stands against the aforesaid face 116 of the trigger, while the forward face 118 of said stop stands a short distance away from the depressed or flattened surface 119 of the locking-cam. If now, the parts being positioned as in Fig. 5, the trigger be drawn back, the sear is thereby drawn down, disengaging the firing-pin slide, which is then thrown forward by the mainspring 40 from the position in Fig. 5 to the position shown in Fig. 6. At the same time the aforesaid inclined faces 116 and 117 of the trigger and trigger-stop, respectively, operate to throw forward the trigger-stop until said stop is stopped by striking the locking-cam; but if prior to pulling the trigger the locking-cam shall be turned back the depression 119 is carried away from the trigger-stop, bringing the full circular face 120 contiguous to said stop, and thereby preventing the trigger from being operated. By this means it is made impossible to fire the gun by pulling the trigger at any time when the locking-cam is not thrown fully forward to its position in Figs. 5 and 6.

The locking-cam (shown in detail in Figs. 15, 16, and 17) is a substantially circular collar, having on the upper side thereof the projecting part 121, whose concentric face 122 forms the locking-surface for locking the breech-block in its uppermost position, while the forward surface 123 acts as a cam for raising the block, and the rearward surface 124 as a cam for depressing the block. The middle part of the locking-cam has formed therein a slot 125 for receiving the aforesaid lower end 35' of the firing-pin slide, which said end bears against the cam-face 126, as illustrated, for instance, in Fig. 7. The circumferential cam-face 122 of the locking-cam bears, when the breech-block is in its uppermost position, (shown in Fig. 5,) against the corresponding abutments 128 128. (See Fig. 12.)

In opening the gun the first backward movement of the locking-cam carries the concentric locking-surfaces 122 of said cam back of the said abutments 128. Next, the cocking-cam face 126 strikes the arm 35' of the firing-pin slide and carries back the same to the position relatively to the block shown in Fig. 7. At the same time the rearward-curved face 124 of the locking-cam strikes the upper face 127 of the aforesaid projection 113 of the trigger-block, and thereby first lowers the breech-block out of engagement with the aforesaid side notches 2 and 4 and then swings the same backward and downward to the position shown in Fig. 7. On reversing the movement of the cam the forward-curved face thereof engages the rearward ends 129 of said abutments 128 of the breech-block and carries the breech-block back to its vertical position (shown in dotted lines in Fig. 8,) and then forces the same up to the position shown in Fig. 5, after which the cam turns forward, leaving the firing-pin slide retracted and in engagement with the sear and bringing the aforesaid flattened portion 119 of the locking-cam adjacent to the forward face 118 of the trigger-stop, thereby permitting the gun to be fired by pulling the trigger.

It will be understood that after the breech-block is lowered to bring the side notches thereof out of engagement with the correpond-ing notches of the breech-piece and swung back any distance the said notches cannot again engage, since the circumferential movement of the outer curved rows of notches is greater than said movement of the inner rows of notches, so that one circular row of notches acts as a guard or preventive against the engagement of the notches of another circular row, thus effectually preventing the breech-block from moving up before it is fully closed. Another means co-operating to this same end is the hereinbefore-described combination with the bored and slotted breech-block of the flattened bushings or journals 52 and 54. When the breech-block is raised, the flattened ends of said bushings enter the opening 73, thus preventing the block from turning; also, when the block is lowered onto said bushings as a journal and is swung back thereon the rounded lower surface 130 of said bushings passes beyond said opening, and thus prevents the premature rising of the breech-block. Thus the several features of construction co-operate together to produce certainty of action of the mechanism.

For extracting the cartridges two oppositely-disposed extractors are provided, (designated by 48 and 50, respectively, and shown in detail in Figs. 31 and 22.) Both extractors being exactly alike, except that one is right-handed and the other left-handed, a detailed description of one of them will serve as a sufficient description of both. The extractor consists of a lever 129, supported by a pin or journal 131 extending from the axis of the lever and fitted to turn in the holes 5 and 7, (shown in dotted lines in Fig. 9,) formed in the side walls D' and D², respectively. The upper end of the extractor-lever is provided with the usual cartridge-rim-engaging lip 55, which is fitted to lie in the corresponding notch 55', Fig. 4, formed in the breech of the gun. When put in place, as shown in Figs. 8 and 9, the extractor-levers lie in the planes, respectively, of the sets of notches 2 and 4. The movement of the extractors is shown by comparison of Fig. 8 with Figs. 4 and 7. The lower ends 132 132 of the extractor-levers are carried back and shaped substantially as shown to properly engage and be operated by the extractor-cams 133 133, respectively, which project from the opposite sides of the breech-block, as shown in the detail drawings of this piece, Figs. 11 to 14, inclusive. The extractors are thrown forward by the action of the cartridge-rim engaging on the lips 55 55 in a well-known manner. The extractors are actuated to withdraw the cartridge by the cams 133 133 engaging the aforesaid lower ends of the extractor-levers in the manner illustrated in Fig. 7ª, which corresponds in position of the breech-block and other details to Fig. 7.

To assemble the mechanism of the gun, the operator first slides the recoil-plate 18 into the dovetail slot 9 of the breech-block C and drives the pin 15 into place. Next the sear-spring 20, Fig. 20, is placed in the hollow lower end of the sear 22, which is then placed in the aforesaid bore 21 in the trigger-block 24. The trigger 26 should next be inserted into the trigger-block and through the sear 22 and the pin 32 driven into place. Next the trigger-stop 34 is inserted in the mortise formed therefor in the trigger-block and secured by means of the pin 31. The trigger-block and its details are now assembled ready to be put into place on the breech-block. The two shell-extractors 48 and 50—one on the right hand and the other on the left hand—are next put in place, as illustrated in Figs. 8 and 9, after which the bushings 52 and 54 are inserted in the holes 5 and 7, when the locking-cam 56 is place between the inner adjacent ends of the said bushings, and the cam-shaft 58 then put in place, as shown in Fig. 16. After this the operator takes the breech-block, and, inserting it, first slides it up over the cam-shaft and bushings, as shown in Fig. 4, and then swings it over to the position shown in dotted lines in Fig. 8. The breech-block being in place, the firing-pin slide, with the firing-pin fixed therein and the spring 40 in place in the bore thereof, is placed in the block C, the arm 35 lying in the slot 102. Next the trigger-block 24, with the parts assembled thereon, is slid into place from below and secured by driving in the pin 45. The lower front face 134 of the trigger-block now forms the stop for limiting the opening movement of the breech-block, as indicated in Fig. 7.

To disassemble the mechanism, it is only necessary to reverse the preceding operations. By driving out the pin 45 the trigger-block may be instantly slipped out, thus completely dismantling the gun. This also permits the removal of the breech-block by permitting it to swing to its position in Fig. 4, when it will drop down and off from its aforesaid journals.

In operating the gun the gunner seizes the handle 64 and swings the same from the forward position (shown by solid lines in Fig. 2) to the rearward position, (shown by dotted lines in said figure,) thereby first lowering the block from its position in Fig. 6 to its dotted position in Fig. 8 and next swinging it from said dotted position backward and downward to the position shown in Fig. 7, at the same time retracting the firing-pin slide, as shown in the latter figure. A cartridge is then slipped into the breech of the gun until the rim comes against the lips 55 of the extractors, as indicated by dotted lines in Fig. 7. Next the movement of the handle is reversed, which raises and throws forward the block from its position in Fig. 7 to the dotted position in Fig. 8, and then raises the same to the locked position (shown in Fig. 5,) when the parts are in position for firing, the trigger-stop standing front of the depressed surface 119 of the locking-cam. When the gun is aimed, the gunner then pulls on the trigger 26, thus drawing down the sear and disengaging the firing-pin slide, as hereinbefore described, thereby allowing the mainspring to drive the firing-pin slide forward to its position, (shown in Fig. 6,) the firing-pin 36 being thus driven through the hole in the recoil-plate 18 and against the primer of the cartridge. On the next backward movement of the handle the breech-block is operated, as before, to open the gun, the aforesaid extractor-cams 133 133 operating the extractors to withdraw the cartridge from the bore of the gun to the position shown by dotted lines in Fig. 7. This movement, owing to the peculiar construction of the extractor-arms and the extractor-cams, is first a powerful slow movement, rapidly accelerating as the breech-block is opened, thus giving to the cartridge-shell an accelerating movement for throwing the same clear of the gun.

The breech-block abutments on the inner walls of the breech-piece of the gun are shown in Figs. 8 and 10 arranged in vertical as well as circular or concentric rows; but it should be understood that the arrangement in vertical rows is not essential, however advantageous the same may be in practice. In Fig. 8ª I have shown a modified arrangement of said abutments, in which the abutting or forward faces of the abutments 4 are set vertically, but are not arranged in vertical rows. When the gun-breech is thus constructed, of course the corresponding notches or abutments 14 on the breech-block must be correspondingly arranged.

The breech-block may, as a whole, be considered as composed of two parts, the upper part being the one designated by C and shown by itself in Figs. 11 to 14, inclusive, the other other part being the trigger-block shown by itself in Figs. 25 to 27, inclusive, and with the details assembled thereon in Figs. 19 to 21, inclusive. The breech-block, considered as a whole, is therefore a composite structure comprising the main block C and the supplemental block 24, the two blocks being connected, as hereinbefore described, by the T-slot and the pin 45, and each block having assembled therein certain details of the operative mechanism.

In some cases a trigger-guard may be attached in the manner illustrated in Fig. 5. The preferred form of this is shown in detail in Figs. 39 and 40. The guard is designated in a general way by 135 and has at its upper end the forwardly-projecting block 140, in which is made the slot 136 for receiving the trigger. The block 140 fits into a mortise formed in the trigger-block 24, the hole 141 coming in alignment with the hole 32ª of said trigger-block. The pin 32 then passes through both said holes and through the trigger, thereby rigidly holding in place the guard 135 and pivotally supporting the trigger itself. A small mortise is formed at 137, Fig. 5, in the lower end of the trigger-block to receive the upturned forward end 138 of the trigger-guard. In assembling these details the upper end of the trigger 26 is placed in the mortise 436 of the trigger-guard, and the said guard is then set in place on the trigger-block 24, as shown in Fig. 5, after which the pin 32 is driven in, thus securing the parts together.

Having thus described my invention, I claim—

1. In a gun in which the breech-block first moves downward in opening and then swings backward, the combination, with the gun-breech having on one or more of the inside walls thereof a series of breech-block-engaging abutments set vertically and located in rows concentric to the axis of swinging movement, of a breech-block supported between said walls to have vertical and swinging movements and constructed to engage on its upward vertical movement the said gun-breech abutments, substantially as described.

2. In a gun in which the breech-block first moves downward in opening and then swings backward, the combination, with the gun-breech having on the opposing inside walls thereof a series of breech-block-engaging abutments arranged in rows concentric to the axis of swinging movement, of a breech-block supported between said walls to have vertical and swinging movements, said breech-block having corresponding abutments constructed and located to engage on the upward movement of said block the said gun-breech abutments, respectively, substantially as described.

3. In a gun in which the breech-block first moves downward in opening and then swings backward, the combination, with the gun-breech having on one or more of the inside walls thereof a series of breech-block-engaging abutments set in vertical and concentric rows, the concentric rows being concentric to the axis of swinging movement, of a breech-block supported between said walls to have vertical and swinging movements and having corresponding rows of abutments constructed to engage said gun-breech abutments when the breech-block is in its upward position, substantially as described.

4. In a gun of the class specified, the combination, in the breech-block, of the main block constructed for vertical and swinging movements and carrying the firing-pin slide and its spring and having a T-slot in the rearward side thereof for receiving the supplemental block, the supplemental block carrying the sear and fitting in said T-slot and extending back of the firing-pin slide to furnish an abutment for the firing-pin spring and projecting below the lower end of the main block to form a stop limiting the opening movement of the breech-block, and a key, substantially as described, removably securing the supplemental block in position longitudinally of the T-slot, substantially as described.

5. The combination, with the gun-breech, of the breech-block fitted therein to have swinging and vertical movements and bored for its journals and having the opening through the lower end thereof of less width than the diameter of said bore and the breech-block journals fitting said bore and reduced in one direction to pass through said opening, said journals being set, substantially as described, with their greatest diameter in the direction of the vertical movement of the breech-block.

6. The combination, with the gun-breech, of the breech-block constructed for vertical and swinging movements therein and bored for its journals and having the opening through the lower end thereof of lesser width than the diameter of said bore, tubular journals reduced in one direction, substantially as described, supported in the gun-breech and supporting the breech-block, a cam-shaft carried in said breech-block journals, and the cam carried on said shaft between said journals and constructed, substantially as described, for imparting to the breech-block vertical and swinging movements.

7. The combination, with the breech-block, the locking-cam, the cocking-cam, the firing-pin slide, and the sear, of the trigger and a trigger-stop, substantially as described, intermediate to the trigger and locking-cam, said locking-cam having a face constructed to engage said stop on its first backward movement for preventing the premature firing of the gun, substantially as described.

8. The combination, with the locking-cam 56, having the circular face 120 and the depressed surface 119, of the sear and trigger, and the trigger-stop intermediate to the trigger and locking-cam and standing contiguous to said depressed face when the locking-cam is in its forward position, whereby the gun is permitted then to be fired, substantially as described.

9. The combination, with the gun-breech, of the breech-block having the axial bore 72 and the opening 73 extending into said bore, the breech-block journals projecting into said bore, the locking-cam, and its actuating-shaft, said cam having the full face 122 for locking the breech-block in its upper position, the cam-face 123 for raising the breech-block by acting upon the corresponding cam-face 129 of said block, and having the cam-face 124 for acting upon the breech-block to lower the same.

10. The combination, with the main breech-block, of the firing-pin slide carried in said block and having the projecting arm, the cam 56, actuating the block and said slide, the supplemental block removably fixed to the main block, the sear 22, carried in the supplemental block and engaging said slide, the sear-spring, the trigger pivotally supported in said block and engaging the sear, the trigger-stop carried in said block intermediate to the trigger and said cam, and means removably securing said supplemental block to the main block, substantially as described.

11. In a gun, the combination, with the breech-block-actuating cam, of the sliding sear, the trigger engaging the sear to actuate the same and having the inclined projecting end, and the trigger-stop supported to be laterally movable intermediate to the cam and trigger and constructed to engage said inclined trigger end, substantially as described.

EDWARD G. PARKHURST.

Witnesses:
HENRY L. RECKARD,
FRANCIS H. RICHARDS.